(12) United States Patent
Reumerman et al.

(10) Patent No.: US 6,847,646 B1
(45) Date of Patent: Jan. 25, 2005

(54) NETWORK COUPLING DEVICE WITH SMALL CELL MEMORY

(75) Inventors: Hans-Jürgen Reumerman, Aachen (DE); Thomas Meuser, Aachen (DE); Veit Pietzuch, Buxtehude (DE); Kai Klapdohr, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1153 days.

(21) Appl. No.: 09/017,096

(22) Filed: Feb. 2, 1998

(30) Foreign Application Priority Data

Feb. 1, 1997 (DE) .......................... 197 03 833

(51) Int. Cl.⁷ ............................... H04L 12/56

(52) U.S. Cl. ................. 370/395.1; 370/412; 370/429

(58) Field of Search ................. 370/233, 235, 370/237, 395.1, 397, 412, 428, 429, 394, 474

(56) References Cited

U.S. PATENT DOCUMENTS

| | | | | | |
|---|---|---|---|---|---|
| 5,434,848 A | * | 7/1995 | Chimento, Jr. et al. | ..... | 370/232 |
| 5,487,061 A | * | 1/1996 | Bray | .......................... | 370/252 |
| 5,524,006 A | * | 6/1996 | Hluchyj et al. | ............. | 370/233 |
| 5,570,361 A | * | 10/1996 | Norizuki et al. | ............ | 370/395 |
| 5,581,545 A | * | 12/1996 | Moritomo | .................... | 370/237 |
| 5,696,764 A | * | 12/1997 | Soumiya et al. | ............ | 370/395 |
| 5,740,173 A | * | 4/1998 | Fiorini | ........................ | 370/394 |
| 5,745,478 A | * | 4/1998 | Wal | ............................. | 370/234 |
| 5,822,540 A | * | 10/1998 | Caldara et al. | ............. | 709/236 |
| 5,825,750 A | * | 10/1998 | Thompson | .................... | 370/244 |
| 5,838,677 A | * | 11/1998 | Kozaki et al. | .............. | 370/389 |
| 5,936,939 A | * | 8/1999 | Jardins et al. | .............. | 370/229 |
| 5,959,991 A | * | 9/1999 | Hatono et al. | .............. | 370/395 |

FOREIGN PATENT DOCUMENTS

WO    WO96297988    9/1996

OTHER PUBLICATIONS

"Dynamics of TCP Traffic over ATM Networks", by Allyn Romanow and Sally Floyd, IEEE JSAC, vol. 13, No. 4, May 1995, pp. 633–644.

"A Queue Manager Chip for Shared Buffer Atm Switches", by Yu–Sheng Lin et al, IEICE Trans. Communication, vol. E79–B, No. 11, Nov. 1996.

\* cited by examiner

*Primary Examiner*—Hassan Kizou
*Assistant Examiner*—Saba Tsegaye

(57) ABSTRACT

A coupling device (switch) for a local network operating in the asynchronous transfer mode (ATM) which comprises a central cell memory (CCM) for buffer storage of packets (frames) formed by individual ATM cells and arriving on feed lines, a central memory control device for controlling the storage in the central cell memory (CCM) and the writing and reading processes of the packets into and from the central cell memory (CCM). The control device includes a counting circuit for counting the ATM cells arriving in the central cell memory (CCM) and a discarding circuit for discarding ATM cells packet by packet for preventing a congestion in the central cell memory (CCM). To enable an efficient buffer management also in the case of very small cell memories, in particular below 1000 cells, the central memory control device comprises at least one comparator device connected upstream of the central cell memory, which comparator device cooperates with the counting circuit and with a control logic such that, when a programmable threshold value ($L_{disc}$) for the degree of filling of the central cell memory (CCM) is reached, a programmable number of links (VC) are defined on the basis of the sequence of arrival of the ATM cells assigned to the relevant link (VC), and in that each ATM cell of the packet belonging to the defined VC value is discarded before it arrives in the central cell memory.

21 Claims, 4 Drawing Sheets

NETWORK COUPLING DEVICE WITH SMALL CELL MEMORY

BACKGROUND OF THE INVENTION

The invention relates to a coupling device (switch) for a local network operating in the asynchronous transfer mode (ATM), which comprises a central cell memory (CCM) for buffer storage of packets (frames) formed by individual ATM cells and arriving on feed lines, a central memory control device for controlling the storage in the central cell memory (CCM) and the writing and reading processes of the packets into and from the central cell memory (CCM), a demultiplexer controlled by the central memory control device for transmitting the packets (frames) further on receiver lines. The control device further includes counting means for counting the ATM cells arriving in the central cell memory (CCM) and discarding means for discarding ATM cells packet by packet for preventing congestion in the central cell memory (CCM).

Blocks of fixed length are formed from the information (messages) to be transmitted in local networks which operate in the asynchronous transfer mode (ATM). Each block is supplemented with additional control information so as to form a transmission unit which is referred to as "ATM cell". Each ATM cell is then composed of a cell header with a length of 5 bytes and an information field (payload) with a length of 48 bytes in which the information to be transmitted is contained.

The available transmission capacity (bandwidth) of a wide-band channel is subdivided into so-called virtual paths (VP) in ATM networks for different transmission purposes such as data transmission services, speech transmission services, video services (for example, video conferences or video databanks), or the transmission of multimedia information where speech, data, and video information are combined with one another. A virtual path in its turn comprises a group of virtual channels (VC). When a virtual link is made between a transmitter and a receiver, the suitable virtual path is first selected. Then part of the bandwidth is occupied as a virtual channel of this path. The VCI mark (virtual channel identifier) is used for the identification of the virtual channel, while the VPI mark (virtual path identifier) is used for the identification of the paths. The specification of VPI and VCI accordingly represents the logic identification for a single link.

When an ATM link is realized over a physical line, this ATM link has the full transmission rate of the physical line at its disposal. Since there is no mutual arrangement between transmission rates within physical lines and the individual ATM links, the traffic of an ATM link must be defined by means of certain parameters. This definition is necessary on the one hand to avoid overload situations in the network and on the other hand to safeguard a certain quality of ATM links.

To achieve this, a traffic contract between an ATM user and the network must be closed as regards the desired ATM link. The ATM network decides on the accepting of a new link on the basis of given traffic parameters, so that the traffic contract is not created until an ATM link is accepted. The ATM network thus ensures that the quality of the link is maintained as required for the ATM application provided this application complies with traffic parameter values agreed in the traffic contract. The UPC function (user parameter control) serves to monitor the traffic parameters.

Certain ATM adaptation layers (AAL) are defined depending on the supported ATM application. The arrangements of the useful data, i.e. larger data packets or synchronous bit streams, are realized in the ATM cells of 53 bytes length each time in the AAL. Several versions exist here:

AAL 1

This version realizes a synchronous bit stream and is used for the adaptation of synchronous speech or video channels, but not for the packet-oriented data communication.

AAL 3/4

This is the adaptation layer originally defined by the CCITT for packet-oriented data communication which comprises additional control structures for multiplexing different data packets on a common virtual channel. This service type supports both non-channel-oriented and VC-oriented LAN communication in ATM networks.

AAL 5

This is the standard for data communication in local ATM networks which is generally accepted at the moment, AAL 5 being much more simply constructed than AAL 3/4. Up to 48 bytes can be transported per ATM cell as a payload in AAL 5, against 44 in AAL 3/4, so that the relative quantity of control information is reduced.

In a transmission file of, for example, $2^{16}$ bits, the information can be transmitted by means of approximately 1300 ATM cells in AAL 5, with the so-called EOM (end of message) bit which signals the end of the transmission being present in the header of the final cell.

A system of the kind mentioned in the opening paragraph is known from "Dynamics of TCP Traffic over ATM Networks", Romanow, Floyd et al., IEEE-JSAC, vol. 13, No. 4, May 1995, pp. 633–644. This system relates to TCP (transmission control protocol) links in ATM networks, where it is the object to avoid congestion in the central memory in the coupling device. This system then is based on a congestion control for the central memory in accordance with the so-called frame discard method. The incoming frames are buffered in the central memory in a VC-oriented manner, and the entire frame belonging to a certain VC is discarded in the case in which congestion arises at the output of the coupling device.

This known system operates in particular by the so-called early packet discard method, which runs as follows: if there is a risk of a central cell memory becoming congested and at least one cell of a connection is identified as being defective, the entire packet is discarded the moment only a single cell is defective. The discarding process is such that those cells of a packet which have yet to be accepted are no longer stored. The packet to be discarded thus does not occupy any memory space. The number of data retransmissions is limited to the relevant discarded packet each time.

In the known system, the so-called resource management application ascertains the degree of filling of the buffer memory used and decides which packet is to be discarded. The effect which this has on the filling is further monitored and, if necessary, further packets are discarded. The discarding process of packets of various links is continued as long as the degree of filling still reaches up to a given threshold value. This known method is suitable for memories having a very great memory capacity, for example capacities of more than 10,000 cells. A disadvantage of this system, however, is that the VC-oriented arrangement of the memory requires an organizer which is specially designed for this arrangement. Since the adaptation process as to the degree of filling of the memory always takes a few milliseconds, a delay effect will arise which renders the use of the early packet drop method unsuitable for small (decentralized) buffer memories for cells.

SUMMARY OF THE INVENTION

The invention has for its object to develop a system of the kind mentioned in the opening paragraph which is suitable for central call memories of small size, i.e. below 1000 cells.

According to the invention, this object is achieved in that the central memory control device comprises at least one comparator device connected upstream of the central cell memory, which comparator device cooperates with the counting means and with a control logic such that, when a programmable threshold value ($L_{disc}$) for the degree of filling of the central cell memory (CCM) is reached, a programmable number of links (VC) are defined on the basis of the sequence of arrival of the ATM cells assigned to the relevant link (VC), and in that each ATM cell of the packet belonging to the defined VC value is discarded before it arrives in the central cell memory.

The invention has the feature that the first incoming cell as well as each subsequent cell of each incoming packet assigned to a certain VC will be discarded, depending on the degree of filling of the memory. This degree is ascertained from the number of stored ATM cells by means of a counter. This means that measures are taken for treating as many received cells as possible depending on the link construction, so that only a small number of the incoming packets are discarded. The solution according to the invention renders it possible for the coupling device itself to lay down the packets to be discarded. Certain links are filtered out from the total stream of cells in accordance with priority criteria and are discarded. A procedure thus arises which is similar to that of the frame discard method, in particular the early packet drop method, but now it is applicable to very small buffer memory sizes (on-chip buffers) of, for example, no more than 128 cells, where an optimized buffer management is essential. The central cell memory management system according to the invention takes into account the fact that there may be "malicious" users who may cause an overload on the coupling device by infringing their traffic contract. According to the invention, packets from such users are detected and preferentially discarded. Those users who adhere to their traffic contract in principle, however, may also occasionally cause memory overspills. The programmable number of the defined links (VC) is obtained in that the VC values of the respective serially consecutive ATM cells having different VC values in the serial data flow are detected, and the different VC values are stored in a table. A programmable number, for example seven, is defined as VC values of cells to be discarded, i.e., whenever such a VC value is recognized in the cell, this cell will be discarded and it will be prevented that further buffer space is occupied for the relevant frame.

A preferred embodiment of the invention is characterized in that the comparator is connected to a discard table which contains the link characteristics (VC) of the frame to be discarded, said discard table activating the discarding means for discarding each incoming ATM cell whose link characteristic (VC) has been laid down in the discard table. The provision of such a discard table can be suitably combined with the control logic such that a simple construction is achieved, the discard table being triggered by the comparator and the associated counter in this manner.

It is ensured that only those data which have a low priority belong to the information which is to be retransmitted, in a further modification of the invention which is characterized in that the central memory control device comprises reading means for recognizing priority information in the cell header, and in that the at least one comparator and the discard table are coupled to the control logic such that only those frames in which the associated ATM cells have a low priority value are taken into account in the definition of the frames to be discarded.

If the maximum number of the defined link characteristics laid down in the discard table is seven, an optimum value for the buffer management is achieved in practice.

A further preferred embodiment is characterized in that the central memory control device comprises at least two comparators with different programmable threshold values such that the discard table is started when the upper threshold value is exceeded in the upward direction, and the discard table is stopped when the lower threshold value is exceeded in the downward direction. The different threshold values thus achieve a switching hysteresis, so that the buffer management can be further optimized through adaptation of the width thereof.

If the central memory control device comprises reading means for recognizing cell discard priority information in the cell header, and a further threshold value for the degree of filling of the central cell memory can be programmed by means of a further comparator which cooperates with the control logic such that those ATM cells whose cell discard priority is high are discarded above the further threshold value, it is possible to make a provisional choice of cells to be discarded already at a low degree of filling of the buffer memory for which the discard table described above is not yet activated; i.e., those cells which have a high discard priority are discarded by way of precaution.

Yet another preferred embodiment is characterized in that the central memory control device comprises a monitoring device for reading out information in the cell header of an ATM cell which is being counted, to supply logic signals to the logic circuit to establish whether this cell can be discarded, or its discard priority. The monitoring means includes reading means for deriving cell loss priority information from the received cell header, priority determination means for reading the priority of the received cell, and destination detection means for recognizing destination information in the cell header.

Inversely, it is advantageous that, upon reaching of substantially the maximum buffer filling, the central memory control device comprises destination detection means for recognizing destination information in the cell header, a third threshold value of a further comparator is programmable for the degree of filling of the central cell memory, and this memory cooperates with the destination detection means and the control logic such that above the third threshold value all ATM cells are discarded which are not control cells destined for the central processing unit (CPU).

Finally, the preferred application of the buffer management strategy described aims at the AAL 3/4 or AAL 5 ATM adaptation layer.

The system according to the invention is preferably used for very small cell memories, for example cell memories integrated on one chip with a capacity of 128 ATM cells, where an optimized buffer management is particularly important.

The invention will be explained in more detail below with reference to an embodiment.

DESCRIPTION OF THE PREFERRED EMBODIMENT

Figure 1:
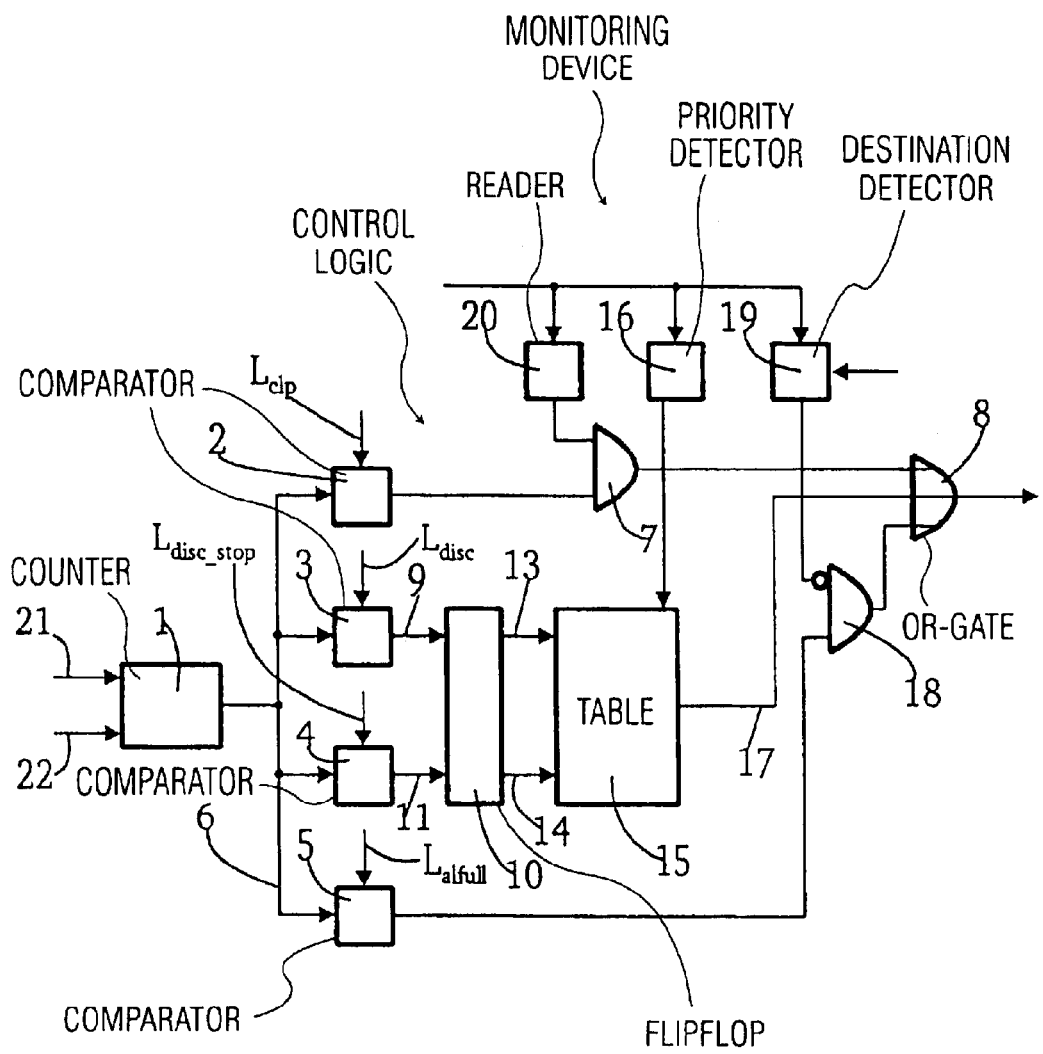
FIG. 1 is a block diagram of a memory control device for a central memory in a coupling device.

FIG. 1 shows a portion of a block diagram of an embodiment of the system according to the invention, representing the buffer management of a cell memory for 128 ATM cells. This memory size is accordingly very small compared with the number of links to be processed, which is, for example, 1024. As described below with respect to FIG. 4, a central memory control device (switch) is shown into which the stream of ATM cells enters (cell arrived), from which it is emitted (cell emitted), or is discarded (cell discarded). The input of this central memory control device is formed by a counter 1 which is incremented (input 21) when an ATM cell enters the memory and which is decremented (input 22) when an ATM cell is emitted or discarded.

The instantaneous counter position value is connected to four comparators 2 to 5 which can each be programmed with fixed threshold values $L_{CLP}$, $L_{disc}$, $L_{disc-stop}$ and $L_{alfull}$. The outputs of the comparators 2 to 5 are connected to a control logic by means of which it is decided whether an individual cell is to be discarded (discard cell) or not.

The input of the control logic is formed here by a monitoring device 41 which comprises reading means 20, a priority determination device 16 and a cell destination information detection device 19, and by means of which the information present in the cell header of the relevant ATM cell being counted is read out.

The device described above operates as follows, referring to the levels shown in FIG. 2.

The bit information CLP (cell loss priority) is derived from the header by the reading means 20, the priority of the cell (prio) is read by the priority determination device 16, and the destination by the cell destination information detection device 19. The cell destination information detection device 19 also receives a characteristic (port identifier) here from a circuit portion not shown, to which destination (port) the relevant cell is to be transmitted.

The four comparators 2 to 5 are connected to the counter 1 by means of bus lines 6. The output of the first comparator 2, which carries out a comparison with the programmed value $L_{CLP}$, is connected to the input of an AND gate 7, whose other input is formed by the information CLP=1. The output of this first AND gate 7 is connected to the input of an OR gate 8.

The output of the second comparator 3 with the programmable threshold value $L_{disc}$ is connected to the set input 9 of a flipflop 10. The output of the third comparator 4, which carries the programmable threshold value $L_{disc-stop}$, is connected to the reset input 11 of the flipflop 10. The start and stop outputs 13 and 14 of the flipflop 10 are coupled to a discard table 15. A further input of the discard table 15 is connected to the low-priority output (prio=0) of the priority detection device 16 for the cell header. The output 17 of the discard table 15 again forms an input of the OR gate 8.

Finally, the output of the fourth comparator 5, which is coupled to the threshold value $L_{alfull}$, is connected to the input of a further AND gate 18. The other input of this further AND gate 18 is connected via an inverting input to the output of the cell destination information detection device 19. The latter device indicates whether a cell is destined for the central processing unit (CPU) or originates therefrom. The output of this further AND gate 18 forms the third input of the OR gate 8.

The OR gate 8 effects the discarding of the relevant cell if a relevant information is applied to one of its inputs. Discarding of the cell accordingly takes place when (1) the cell loss priority is equal to 1, and the comparator 2 detects that the cell count via L is equal to $L_{CLP}$, or
(2) a relevant indication is given from the discard table 15, or
(3) a relevant indication is given from the fourth comparator 5 when the counter position $L_{alfull}$ is exceeded, and the cell is not destined for the central processing unit (CPU) or originates therefrom.

Figure 2:
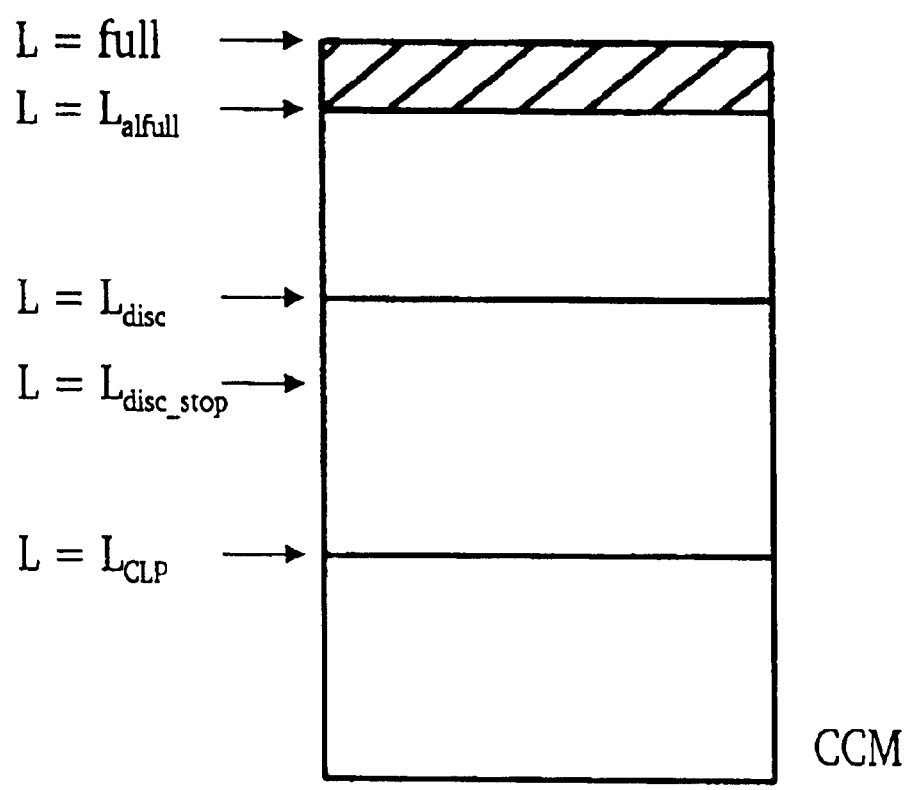
FIG. 2 is a fill-level diagram showing thresholds in the device of FIG. 1 for clarifying the discarding strategy for the central memory.

More in detail, the following operation results therefrom (cf. FIG. 2).

Assuming that the degree of filling of a central cell memory CCM not shown here is initially at a very low level, i.e. below the line $L=L_{CLP}$, all incoming cells are stored in the intermediate buffer. This means that all cells are stored, for all VC links, independently of the priority and of the question whether CLP=0 or =1.

When the first threshold value $L_{CLP}$ is reached, only those ATM cells are stored in the buffer which have CLP=0, whereas those having CLP=1 are discarded. Those ATM cells which have a high loss priority are accordingly discarded.

However, if the degree of filling rises further, an additional measure for storage reduction is taken at the next threshold value $L=L_{disc}$, as described below.

First the discard table 15 is written, in which up to seven entries are present, filled with the VCs of the low-priority cells (prio=0) flowing past. Examples of this are cells which originate from the ABR (available bit rate) mode. These VC values then define those packets (frames) which are to be discarded. The cells corresponding to these VCs are accordingly discarded upon entering the discarding device, i.e. before they reach the memory.

When the counter position drops again to a value of $L_{disc-stop}$, the procedure described above is interrupted in that the discard table 15 is stopped. All ATM cells are stored in the buffer again which have a CLP priority different from one.

On the other hand, when the level $L=L_{alfull}$ is reached, no cells at all are stored in the buffer memory any more, except for those which are destined for or originate from the central processing unit (CPU). All other cells are no longer accepted.

If the degree of occupation rises still further, all cells are discarded, independently of the VC value and the priority.

The method of operation according to the invention in the occupation range between $L=L_{CLP}$ and $L=L_{alfull}$ has the advantage that only a certain number of frames is to be retransmitted: in the range below $L_{disc}$ only those frames containing CLP 1, and in the range between $L_{disc}$ and $L_{alfull}$ only those which have CLP=1 and the VC value stored in the discard table 15.

This is a considerable advantage over known cell memory discarding methods for small cell memories for which the frames are randomly influenced, and accordingly a retransmission of all randomly affected frames is often necessary.

In the case of VBR (variable bit rate) data traffic, long bursts may arise through static multiplexing of the cells, which may lead to congestion. The CBR (constant bit rate) data traffic by contrast is essentially not affected by the method according to the invention because these types of traffic contribute only very little to any congestion of the memory as compared with the ABR or VBR data traffic.

The threshold values for the comparators 2 to 5 may be freely adapted to the envisaged strategic behavior. For example, the threshold values $L_{CLP}$ and $L_{disc}$ may be interchanged.

For a further clarification of the system according to the invention reference is made to a status flow diagram for the discard table 15 in accordance with which the discard table 15 is written, read, and evaluated.

Figure 3:
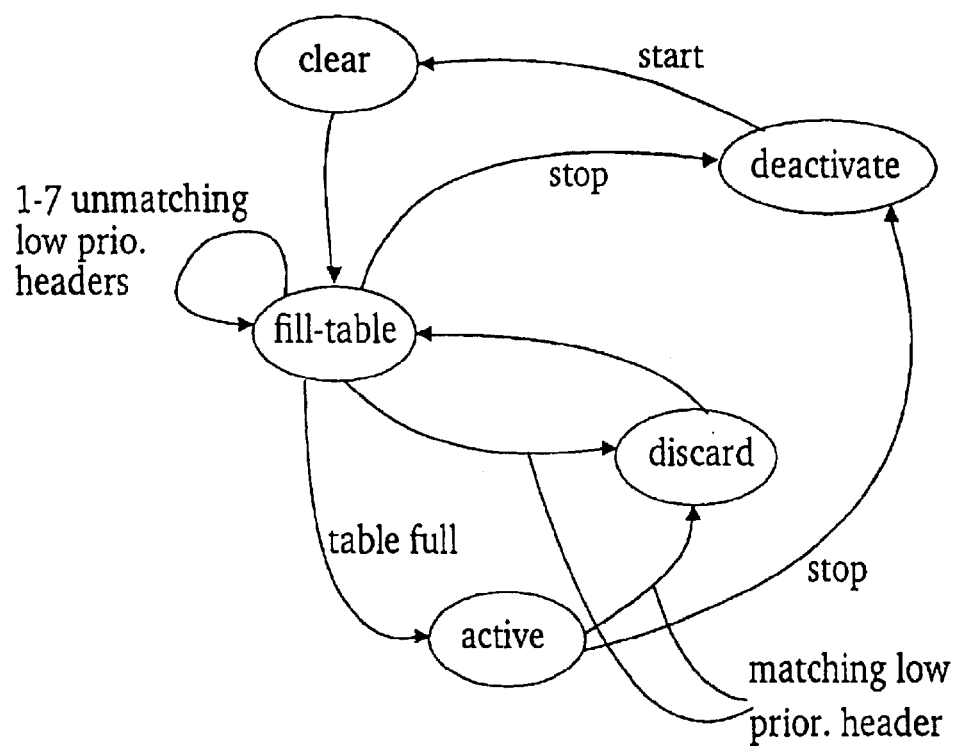
FIG. 3 is a status flow diagram for the discard table in the device of FIG. 1.

The initial state in the status diagram of FIG. 3 is the "deactivate" state. When the second comparator sets the flipflop owing to the fact that the programmed threshold value $L_{disc}$ is reached, the discard table receives the "start" command, which first leads to the state "clear", after which the process of filling the discard table is carried out. During filling of the discard table ("fill-table") the serially incoming cell headers of the ATM cells are inspected, i.e. only those having the low priority (prio=0 at the output of 16). Each VC value which is detected and has not yet been entered in the table ("unmatched") is stored until the table has been filled with seven VC values. When a cell whose VC value has been stored in the table is found to come in, i.e. "matched", this cell is discarded ("discard").

After the discard table has been completely filled ("table full"), the discarding device will operate in the "active" state such that a cell is discarded whenever a match with a stored VC value is detected.

When the discard table is reset by the stop output of the flipflop upon a relevant drop in the degree of filling, it will enter the original "deactivate" state again.

Figure 4:
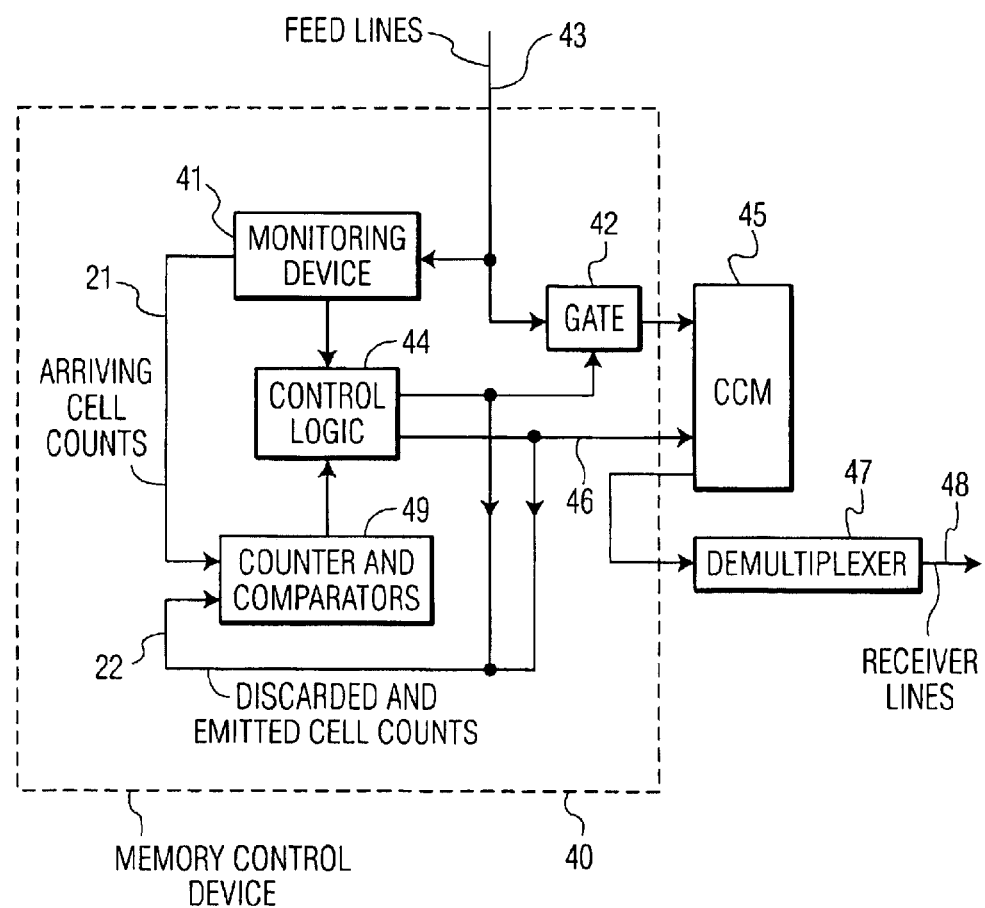
FIG. 4 is an overall block diagram of a coupling device according to the invention

The entire coupling device (switch) is shown in FIG. 4. A central memory control device 40 receives ATM cells over feed lines 43 and provides them to the monitoring device 41 which evaluates the cell header, and to the gate 42. The gate 42 receives discard signals from the gate 8 (see FIG. 1) of control logic 44 and sends cells, which are not to be discarded, to the central cell memory (CCM) 45 which in this embodiment has a capacity of 128 cells. In this embodiment the control logic 44 includes the flipflop 10, discard table 15, and gates 7, 8 and 18 shown in FIG. 1. When a packet, stored in the CCM 45, is to be transmitted, control signals are provided by the control logic 44 over a line 46 to CCM 45 which cause the ATM cells of that packet to be output from the memory. The cells which have been outputted are then provided to a demultiplexer 47 for transmission over receiver lines 48. The signals for emitting cells are combined with the discard signals to provide decrementing signals to a counter and comparators device 49 which includes the counter 1 and comparators 2 to 5 shown in FIG. 1.

It will be clear to those of ordinary skill in the art that many variations from the disclosed embodiment fall within the appended claims. As non-limiting examples, the comparator device may be programmed for fewer, or more, degrees of filling of the central cell memory; the discard table may store fewer, or more, VC values, or may store other characteristics which are utilized to identify cells which are to be considered for discarding. Different logical arrangements can define the count which is provided to the comparator(s), and the control logic can take many forms.

What is claimed is:

1. A coupling device, for a network operating in the asynchronous transfer mode (ATM), comprising:

means for receiving individual ATM cells each having a respective header, a central cell memory for buffer storage of packets formed by said individual ATM cells, a central memory control device for controlling storage in the central cell memory and the writing and reading processes for packets stored in and read from the central cell memory, counting means for a number of ATM cells stored in said central cell memory, and discarding means for discarding ATM cells packet by packet to prevent congestion in the central cell memory, characterized in that the central memory control device comprises:

comparator means connected upstream of the central cell memory, and control logic means, said comparator means cooperating with the counting means and the control logic means such that, responsive to a programmable threshold value for the degree of filling of the central cell memory being reached, and evaluation of information determinable from the header of a received cell relating to the packet of which the received cell is a part, each ATM cell of the packet containing said received cell is discarded before arriving in the central cell memory.

2. A device as claimed in claim 1, characterized in that said evaluation of information comprises defining a programmable number of links on the basis of the sequence of arrival of the ATM cells assigned to a relevant link, each ATM cell of the packet belonging to the defined VC value being discarded.

3. A device as claimed in claim 1, characterized in that AAL 3/4 or AAL 5 is used as an ATM adaptation layer.

4. A device as claimed in claim 1, characterized in that the central memory control device further comprises monitoring means for reading out information in the cell header of an ATM cell which is being counted, said monitoring means including reading means for deriving cell loss priority information from a received cell header, priority determination means for reading the priority of the received cell, and destination detection means for recognizing destination information in a received cell header, said evaluation of information being responsive to an output of said monitoring means.

5. A device as claimed in claim 1, characterized in that the central memory control device further comprises reading means for recognizing cell discard priority information in a received cell header, and a further comparator having a programmable threshold value for the degree of filling of the central cell memory, said further comparator cooperating with the control logic such that, responsive to a programmable threshold value for the degree of filling of the central cell memory being exceeded, those ATM cells whose cell discard priority is high are discarded.

6. A device as claimed in claim 1, characterized in that the central memory control device further comprises destination detection means for recognizing destination information in a received cell header, and a further comparator having a programmable threshold value for the degree of filling of the central cell memory, said further comparator cooperating with the control logic such that, responsive to a programmable threshold value for the degree of filling of the central cell memory being reached, all ATM cells are discarded which are not control cells destined for a central processing unit.

7. A device as claimed in claim 6, characterized in that the central memory control device comprises at least two comparators having different programmable threshold values, one of said comparators having an upper threshold value, and the other of said comparators having a lower threshold value, said discard table being started when the upper threshold is exceeded in an upward direction, and the discard table being stopped when the lower threshold is exceeded in a downward direction.

8. A device as claimed in claim 1, characterized in that said control logic means includes a discard table, containing link characteristics of a packet to be discarded, for activating the discarding means responsive to an incoming ATM cell having the link characteristics which are contained in the discard table, said comparator means including at least one comparator connected to said discard table.

9. A device as claimed in claim 8, characterized in that the central memory control device further comprises reading means for recognizing priority information in the cell header, and said comparator means and the discard table are coupled to the control logic such that only packets in which associated ATM cells have a low priority value are taken into account in defining packets to be discarded.

10. A device as claimed in claim 8; characterized in that a maximum of seven defined link characteristics is contained in the discard table.

11. A coupling device, for a network operating in the asynchronous transfer mode (ATM), comprising:

means for receiving individual ATM cells each having a respective header, a central cell memory for buffer storage of packets formed by said individual ATM cells, a central memory control device for controlling storage in the central cell memory and the writing and reading processes for packets stored in and read from the central cell memory, counting means for counting the ATM cells arriving on said means for receiving, and discarding means for discarding ATM cells packet by packet to prevent congestion in the central cell memory, characterized in that the central memory has a cell capacity of fewer than 1000 cells, and the central memory control device comprises:

comparator means connected upstream of the central cell memory, and control logic means, said comparator means cooperating with the counting means and the control logic means such, that, responsive to a programmable threshold value for the degree of filling of the central cell memory being reached, and evaluation of information determinable from the header of a received cell relating to the packet of which the received cell is a part, a programmable number of links are defined on the basis of the sequence of arrival of the ATM cells assigned to a relevant link, each ATM cell of the packet belonging to the defined VC value being discarded before arriving in the central cell memory.

12. A device as claimed in claim 11, characterized in that said evaluation of information comprises defining a programmable number of links on the basis of the sequence of arrival of the ATM cells assigned to a relevant link, each ATM cell of the packet belonging to the defined VC value being discarded, and AAL 3/4 or AAL 5 is used as an ATM adaptation layer.

13. A device as claimed in claim 11, characterized in that characterized in that the central memory control device further comprises monitoring means for reading out information in the cell header of an ATM cell which is being counted, said monitoring means including reading means for deriving cell loss priority information from a received cell header, priority determination means for reading the priority of the received cell, and destination detection means for recognizing destination information in a received cell header, said evaluation of information being responsive to an output of said monitoring means.

14. A device as claimed in claim 11, characterized in that the central memory control device further comprises reading means for recognizing cell discard priority information in a received cell header, and a further comparator having a programmable threshold value for the degree of filling of the central cell memory, said further comparator cooperating with the control logic such that, responsive to a programmable threshold value for the degree of filling of the central cell memory being exceeded, those ATM cells whose cell discard priority is high are discarded.

15. A device as claimed in claim 11, characterized in that the central memory control device further comprises destination detection means for recognizing destination information in a received cell header, and a further comparator having a programmable threshold value for the degree of filling of the central cell memory, said further comparator cooperating with the control logic such that, responsive to a programmable threshold value for the degree of filling of the central cell memory being reached, all ATM cells are discarded which are not control cells destined for a central processing unit.

16. A device as claimed in claim 11, further comprising a demultiplexer controlled by the central memory control device for transmitting the packets further on receiver lines.

17. A device as claimed in claim 11, characterized in that said control logic means includes a discard table, containing link characteristics of a packet to be discarded, for activating the discarding means responsive to an incoming ATM cell having the link characteristics which are contained in the discard table, said comparator means including at least one comparator connected to said discard table.

18. A device as claimed in claim 17, characterized in that the central memory control device further comprises reading means for recognizing priority information in the cell header, and said comparator means and the discard table are coupled to the control logic such that only packets in which associated ATM cells have a low priority value are taken into account in defining packets to be discarded.

19. A device as claimed in claim 18, characterized in that a maximum of seven defined link characteristics is contained in the discard table, and that AAL 3/4 or AAL 5 is used as an ATM adaptation layer.

20. A device as claimed in claim 18, characterized in that the central memory control device comprises at least two comparators having different programmable threshold values, one of said comparators having an upper threshold value $L_{disc}$, and the other of said comparators having a lower threshold value $L_{disc\text{-}stop}$, said discard table being started when the upper threshold is exceeded in an upward direction, and the discard table being stopped when the lower threshold is exceeded in a downward direction.

21. A device as claimed in claim 20, characterized in that the central memory control device further comprises destination detection means for recognizing destination information in a received cell header, and a further comparator having a third programmable threshold value $L_{alfull}$ for the degree of filling of the central cell memory, said further comparator cooperating with the control logic such that, responsive to a programmable threshold value for the degree of filling of the central cell memory being reached, all ATM cells are discarded which are not control cells destined for a central processing unit.

* * * * *